Nov. 21, 1939.  H. C. BOWEN  2,180,453
BRAKE
Filed July 20, 1936

INVENTOR
HERBERT C. BOWEN
BY William Bradbury,
McCaleb & Hinkle
ATTORNEYS

Patented Nov. 21, 1939

2,180,453

UNITED STATES PATENT OFFICE 2,180,453

BRAKE

Herbert C. Bowen, Detroit, Mich., assignor to Hydraulic Brake Company, Detroit, Mich., a corporation of California Application July 20, 1936, Serial No. 91,513

13 Claims. (Cl. 188—79.5)

This invention relates to brake structures, and more particularly to means for adjusting the friction elements of brakes.

An object of the invention is to provide means for automatically adjusting the friction element of a brake to compensate for wear of the lining on the friction element.

Another object of the invention is to provide an automatic adjustment for a friction element of a brake controlled by the wear of the lining on the friction element.

A further object of the invention is to provide means for supporting the friction elements of a brake in proper spaced relation to the drum of the brake when such elements are in retracted position.

Still a further object of the invention is to provide an automatic adjustment for the friction elements of a brake operative to effect positive adjustments proportionate to the wear of the lining on the friction elements, an automatic adjustment which is highly efficient and yet of marked simplicity as a whole and in respect to each of its component parts so that its manufacture may be economically facilitated both as regards the parts and their assembly.

Figure 1:
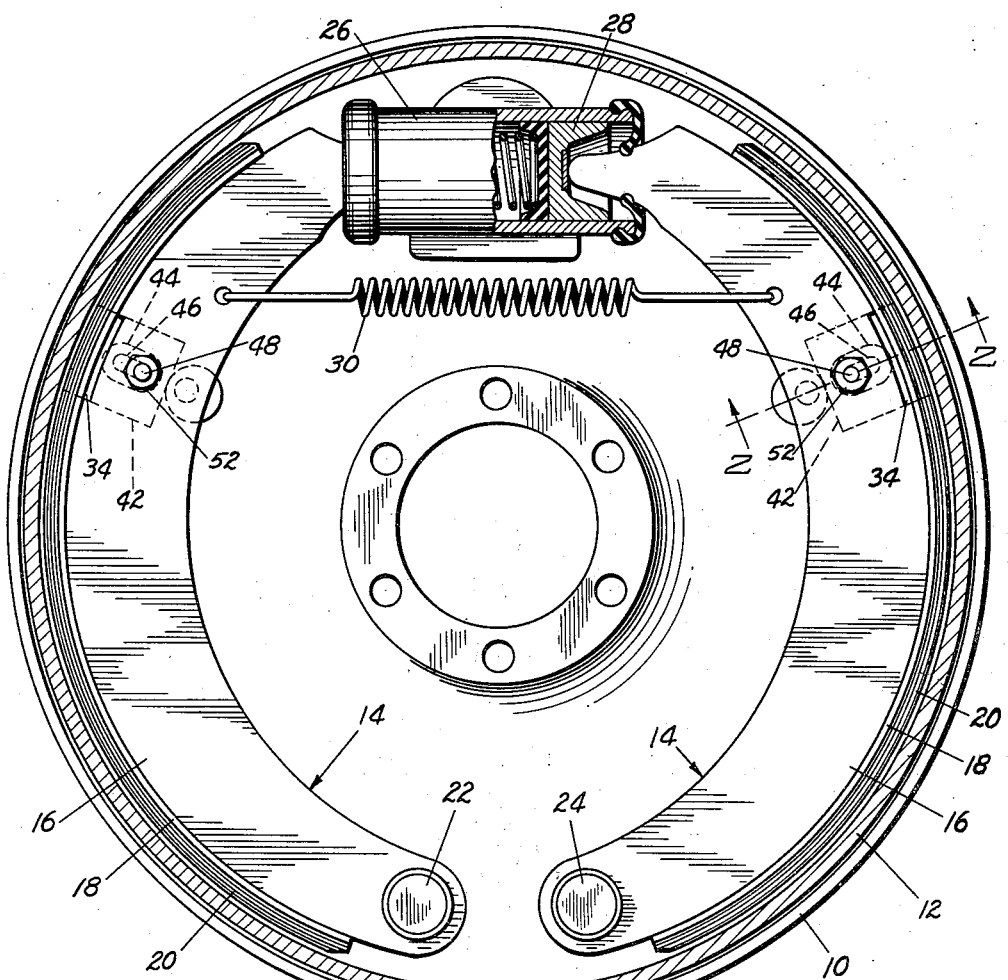
Figure 2:
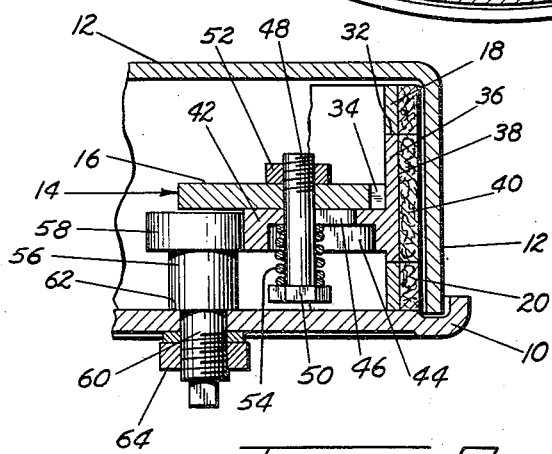

Other objects and advantages of the invention will more fully appear from the following description taken in connection with the accompanying drawing illustrating one embodiment of the invention, and in which;

Fig. 1 is a vertical sectional view of a conventional two-shoe brake embodying the invention; and Fig. 2 is a sectional view substantially on line 2—2, Fig. 1.

Referring to the drawing for more specific details of the invention, 10 represents a fixed support or backing plate, and 12 a rotatable drum associated with the backing plate. A pair of corresponding interchangeable friction elements or shoes 14 are arranged on the backing plate. Each friction element includes a web 16 supporting a rim 18 having secured thereto a friction lining 20 adaptable for cooperation with the drum 12, and the articulate ends of the respective friction elements are anchored on the backing plate as indicated at 22 and 24.

A fluid pressure actuated motor 26 suitably secured to the backing plate between the friction elements 14 includes oppositely disposed pistons 28, only one of which is shown, in thrust engagement with the separable ends of the friction elements 14, and a retractile spring 30 connects the friction elements. The motor is operative to spread the friction elements into engagement with the drum against the resistance of the retractile spring. The structure thus far described is that of a conventional hydraulically actuated two-shoe brake well known to those versed in the art.

Generally brakes of the type hereinabove described, and many other types, are provided with retractile stops arranged on the backing plate to support the friction elements when such elements are in retracted position.

Universally the retractile stops employed are manually adjusted so that the friction elements may be supported in proper spaced relation to the drum when these elements are in retracted position.

The inherent difficulty experienced in effecting a proper adjustment of the retractile stops is entirely due to complete dependency on the skill of garage mechanics, and since this personnel often lacks the required experience unsatisfactory brake adjustments frequently result. Hence the desirability of eliminating this factor by the provision of an automatic adjustment means for the friction elements of brakes operative with such precision as to invariably support the friction elements, when in retracted position, in proper spaced relation to the drum so as to compensate for wear on the friction lining.

As shown, each friction element has cut or stamped therefrom a portion of its web 16 and a portion of its rim 18 so as to provide an opening 32 in the rim and a slot 34 in the web. The opening in the rim is preferably rectangular and is located nearer the separable ends of the friction elements than the articulate ends of the friction elements. This location of the opening is particularly desirable because the maximum wear on the friction lining invariably occurs on this portion.

A block 36 fitted into the opening 32 and movable relative to the friction elements has a face 38 of the same arc as the arc of the friction elements so as to present a uniform surface, and suitably secured to the face 38 is a lining 40 of lower frictional coefficient than the lining 20 on the friction elements. The face of the lining 40 on the block 36 is in the same arc as the face of the lining 20 on the friction elements, and the wear on the lining 40 is substantially nil.

A lug or web 42 depending from the back of the block 36 is flapped against and has frictional engagement with the web 16 of the friction elements. Preferably the web 42 has a recess 44, and a slot 46 in the web is located in the bottom of the recess. A bolt 48 mounted in an opening in the web 16 of the friction elements has a head 50 on one end and is threaded on its other end for the reception of a tap 52. This bolt is received by the slot 46 in the dependent web 42 on the back of the plate 36, and sleeved on the bolt between its head 50 and the web 42 is a coil spring 54. By turning the tap 52 the tension of the spring 54 may be regulated so as to increase or decrease friction between the web 16 of the friction elements and the web 42 of the block.

A stub shaft 56 mounted on the backing plate has thereon an eccentric 58 engaging the web 42 of the block 36. The function of this eccentric is to limit the movement of the block 36. The shaft has a reduced section 60 providing in conjunction with the body of the shaft an annular shoulder 62. The shoulder seats on the inner surface of the backing plate, and the reduced portion extends through an opening in the backing plate, and a nut 64 is threaded on the reduced portion 60 for locking the shaft against rotation.

Under normal operating conditions, when the brake is applied the friction elements 14 are actuated by the motor 28 to engage the linings 20 on the rims 18 of the friction elements with the drums so as to retard rotation of the drums. This operation causes wear on the linings resulting in unsatisfactory adjustment of the friction elements when returned to the retracted position under the influence of the spring 30 at the conclusion of a braking operation, necessitating a greater movement of the friction elements on a subsequent braking application.

In the instant development, upon a normal application of the brakes, the linings 20 on the friction elements and the linings 40 on the blocks 36 engage the braking surface of the drums concomitantly. The linings 20 on the friction elements are subjected to the usual wear incidental to such an operation, and the linings 40 on the blocks, because of their low coefficient of friction, resist wear. Accordingly, there results a relative movement between the friction elements 14 and the blocks 34 as the faces of the linings 20 and 40 assume their respective positions in an arc common to both linings and to the braking surface of the drums.

The blocks 36 have webs 42 slidable on the webs 16 of the friction elements, and suitable means is provided for retaining the webs of the blocks and the webs of the friction elements together and frictionally opposing the sliding movement of the webs 42 so that upon return of the friction elements to their retracted positions the webs 42 will engage the eccentric 58 so as to support the friction elements in proper spaced relation to the braking surface of the drum for subsequent braking operations.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a friction element, a retractile stop associated therewith, and a member spring pressed against the element to provide frictional engagement therewith, said member having a wear resisting lining and cooperating with the stop.

2. A brake comprising a friction element having a lining, a retractile stop associated therewith, and a member adjustable on the friction element in frictional engagement therewith having a wear-resisting lining and a part for cooperation with the stop.

3. A brake comprising a movable member, a friction element having a lining for cooperation with the movable member, a retractile stop for the friction element, and a member frictionally mounted on the friction element having a wear-resisting lining for cooperation with the movable member and a part for cooperation with the stop.

4. A brake comprising a movable member, a frictional element having a lining for cooperation with the movable member, a retractile stop associated with the friction element, and a member carried by and frictionally movable on the friction element having a wear-resisting lining for cooperation with the movable member and a part for cooperation with the stop.

5. A brake comprising a movable member, a friction element having a lining for cooperation with the movable member, a retractile stop associated with the friction element, an adjustable member carried by the friction element and arranged for cooperation with the stop, means frictionally resisting movement of the adjustable member, and a wear-resisting lining on the adjustable member for cooperation with the movable member.

6. A brake comprising a fixed support, a rotatable drum associated therewith, a friction element on the fixed support having a lining for cooperation with the drum, a retractile stop for the friction element, a member frictionally mounted on the friction element for cooperation with the stop, and a wear-resisting lining on the frictionally mounted member for cooperation with the drum.

7. A brake comprising a fixed support, a rotatable drum associated therewith, a friction element on the fixed support having a lining for cooperation with the drum, means for actuating the friction element to engage the lining with the drum, a retractile stop for the friction element, a member slidably mounted on the friction element for cooperation with the stop, a wear-resisting lining on the slidable member for cooperation with the drum, and means frictionally resisting movement of the slidable member.

8. A brake comprising a fixed support, a rotatable drum associated therewith, a friction element on the fixed support having a lining for cooperation with the drum, means for moving the friction element to engage the lining with the drum, a retractile stop for the friction element, and a member carried by the friction element and clamped frictionally thereto having a wear-resisting lining for cooperation with the drum and a part for cooperation with the stop.

9. A brake comprising a friction element including a web, and a rim supported by the web, each cut away to provide a slot, an adjustable member slidable in the slot and clamped frictionally to the web, and a stop for cooperation with the member.

10. A brake comprising a friction element including a web, a rim supported thereby and a lining secured to the rim, each cut away to provide a slot, an adjustable member slidable in the slot and clamped frictionally to the web, a wear-resisting lining on the adjustable member coextensive with the lining on the friction element, and a stop cooperating with the adjustable member.

11. A brake comprising a friction element having a slot, a lining on the friction element having a slot registering with the slot in the friction element, an adjustable member in the slots clamped frictionally to the element and movable proportionately to wear of the lining on the friction element, means for regulating the frictional resistance to movement of the adjustable member, and a stop for cooperation with the adjustable member.

12. A brake comprising a friction element, a retractile stop associated therewith, and a member having a wear resisting lining and clamped frictionally to the element for cooperation with the stop, said member projecting through an opening in the friction element.

13. A brake comprising a friction element, a retractile stop associated therewith, and a member having a wear resisting lining and clamped frictionally to the element for cooperation with the stop.

HERBERT C. BOWEN.